US008548574B2

(12) United States Patent
Wang

(10) Patent No.: US 8,548,574 B2
(45) Date of Patent: Oct. 1, 2013

(54) HYBRID 2-D ECG DATA COMPRESSION BASED ON WAVELET TRANSFORMS

(75) Inventor: Xingyuan Wang, Dalian (CN)

(73) Assignee: Empire Technology Development LLC, Wilmington, DE (US)

( * ) Notice: Subject to any disclaimer, the term of this patent is extended or adjusted under 35 U.S.C. 154(b) by 698 days.

(21) Appl. No.: 12/835,277

(22) Filed: Jul. 13, 2010

(65) Prior Publication Data
US 2012/0014575 A1 Jan. 19, 2012

(51) Int. Cl.
*A61B 5/0402* (2006.01)
(52) U.S. Cl.
USPC .......................................... 600/509; 600/508
(58) Field of Classification Search
None
See application file for complete search history.

(56) References Cited

U.S. PATENT DOCUMENTS

| 5,602,589 A | 2/1997 | Vishwanath et al. |
| 6,337,881 B1 | 1/2002 | Chaddha |

OTHER PUBLICATIONS

Jalaleddine S, et al., ECG data compression techniques—A unified approach. IEEE Transactions on Biomedical Engineering, Apr. 1990, 37(4): 329-343.
Cox, J. R., et al., AZTEC, a preprocessing program for real-time ECG rhythm analysis, IEEE Transactions on Biomedical Engineering, 1968, 15(2): 128-129.
Hamilton, P.S., et al., Compression of the ambulatory ECG by average beat subtraction and residual differencing, IEEE Transactions on Biomedical Engineering, 1991, 38(3): 253-259.
Nave, G., et al., ECG compression using long-term prediction, IEEE Transactions on Biomedical Engineering, 1993, 40(9): 877-885.
Philips, Wilfried, ECG data compression with time-warped polynomials, IEEE Transactions on Biomedical Engineering, 1995, 42(11): 1095-1101.
Ahmed, N., et al., Electrocardiographic data compression via orthogonal transform, IEEE Transactions on Biomedical Engineering, 1975, 22(6): 484-487.
Shankara, B.R., et al., ECG data compression using Fourier descriptors, IEEE Transactions on Biomedical Engineering, 1986, 33(4): 428-433.
Hilton, Michael L., Wavelet and wavelet packet compression of electrocardiograms, IEEE Transactions on Biomedical Engineering, 1997, 44(5): 394-402.
Ramakrishnan, A., et al., ECG coding by wavelet-based linear prediction, IEEE Transactions on Biomedical Engineering, 1997, 44(12): 1253-1261.
Lee, H., et al., ECG data compression using cut and align beats approach and 2-D transform, IEEE Transactions on Biomedical Engineering, 1999, 46(5): 556-564.
Anant, K., et al., Vector quantization of ECG wavelet coefficients, IEEE Signal Processing Letters, 1995, 2(7): 129-131.

(Continued)

*Primary Examiner* — Carl H Layno
*Assistant Examiner* — Paula J Stice
(74) *Attorney, Agent, or Firm* — Foley & Lardner LLP

(57) ABSTRACT

Implementations and techniques for hybrid 2-D ECG data compression based on wavelet transforms are generally disclosed. In accordance with some implementations, a method for compressing electrocardiogram (ECG) data may include receiving a one-dimensional (1-D) ECG signal, generating a two-dimensional (2-D) ECG data array from the 1-D ECG signal, wavelet transforming the 2-D ECG data array to generate wavelet coefficients including a low frequency subband, a first intermediate frequency subband, a second intermediate frequency subband, and a high-frequency subband, and encoding the wavelet coefficients to generate compressed ECG data. Encoding the wavelet coefficients may include subjecting the low frequency subband, the first intermediate frequency subband, the second intermediate frequency subband, and the high frequency subband to different encoding schemes.

20 Claims, 9 Drawing Sheets

(56) References Cited

OTHER PUBLICATIONS

Bradie, Brian, Wavelet packet-based compression of single lead ECG, IEEE Transactions on Biomedical Engineering, 1996, 43(5): 493-501.

Lu, Z., et al., Wavelet compression of ECG signals by the set partitioning in hierarchical trees algorithm, IEEE Transactions on Biomedical Engineering, 2000, 47(7): 849-856.

Miaou, S.G., et al., Wavelet-based ECG compression using dynamic vector quantization with tree codevectors in single codebook, IEEE Transactions on Biomedial Engineering, 2002, 49(7): 671-680.

Said, A., et al., A new, fast, and efficient image codec based on set partitioning in hierarchical trees, IEEE Transactions on Circuits and Systems for Video Technology, 1996, 6(3): 243-250.

Okada, Masahiko, A digital filter for the QRS complex detection, IEEE Transactions on Biomedical Engineering, 1979, 26(12): 700-703.

Kadambe, S., et al, Wavelet transform-based QRS complex detector, IEEE Transactions on Biomedical Engineering, 1999, 46(7): 838-848.

Moody, G.B., et al., The impact of the MIT/BIH arrhythmia database, IEEE Engineering in Medicine and Biology, 2001, 22(3): 45-50.

Zigel, Y., et al., The weighted diagnostic distortion (WDD) measure for ECG signal compression, IEEE Transactions on Biomedical Engineering, 2000, 47(11): 1422-1430.

Sweldens, Wim, The lifting scheme: A custom-design construction of biorthogonal wavelets, Applied and Computational Harmonic Analysis, 1996, 3(2): 186-200.

Calderbank, A.R., et al., Wavelet transforms that map integers to integers, Applied Computational Harmonic Analysis, 1998, 5(4): 332-369.

Linde, Y., et al., An algorithm for vector quantizer design, IEEE Transactions on Communications, 1980, 1(1): 84-95.

Bilgin, A., et al., Compression of Electrocardiogram signals using JPEG2000, IEEE Transactions on Consumer Electronics, 2003, 49(4): 833-840.

Tai, S.C., et al., ECG Compression method based on wavelet transform and modified SPIHT, IEEE Transactions on Biomedical Engineering, 2005, 52(6): 999-1008.

Wang, Xingyuan, et al., A 2-D ECG Compression algorithm based on wavelet transform and vector quantization, Digital Signal Processing, 2008, 18:179-188.

Mehrseresht, N., and Taubman, D., "Adaptively weighted update steps in motion compensated lifting based scalable video compression," International Conference on Image Processing, 2003, vol. 3, pp. II-771-4.

700 A computer program product.

702 A signal bearing medium.

704 at least one of one or more instructions for receiving a one-dimensional (1-D) ECG signal;

one or more instructions for generating a two-dimensional (2-D) ECG data array;

one or more instructions for wavelet transforming a 2-D ECG data array;

one or more instructions for encoding wavelet coefficients to generate compressed ECG data;

one or more instructions for subjecting a low frequency subband to a first encoding scheme;

one or more instructions for subjecting a first intermediate frequency subband to a second encoding;

one or more instructions for subjecting a second intermediate frequency subband to a third encoding scheme;

one or more instructions for subjecting the high frequency subband to a fourth encoding scheme;

one or more instructions for determining a plurality of heartbeat periods;

one or more instructions for determining a statistical heartbeat period;

one or more instructions for determining a plurality of heartbeat period difference values;

one or more instructions for determining a plurality of R-peak values;

one or more instructions for determining a statistical R-peak value; or one or more instructions for determining a plurality of R-peak difference values.

| 706 a computer-readable medium. | 708 a recordable medium. | 710 a communications medium. |

FIG. 7

HYBRID 2-D ECG DATA COMPRESSION BASED ON WAVELET TRANSFORMS

BACKGROUND

Unless otherwise indicated herein, the approaches described in this section are not prior art to the claims in this application and are not admitted to be prior art by inclusion in this section.

The electrocardiogram (ECG) may be an important physiological signal for cardiac diagnosis. Typically, an ECG signal includes a large quantity of data that increases with sampling rate, sample resolution, etc. For example, storing a twenty-four hour recording of ECG signal data for subsequent analysis may require on the order of 100 megabytes of digital storage. Hence, ECG data compression may be important for storage, transmission and telediagnosis.

ECG compression aims to reduce the amount of digitized ECG data while preserving important diagnosis features of the ECG signal. Various ECG data compression methods have been proposed over the last three decades. These approaches can be divided into two major categories: direct methods and transform methods. Known direct data compression methods include the amplitude zone epoch coding (AZTEC) technique, the turning point (TP) algorithm, the scan-along polygonal approximation (SAPA), to name a few examples. In transform coding methods, a linear transform may be applied to an ECG signal before applying compression in the transform domain. Known transform techniques include Fourier transform, Walsh transform, discrete cosine transform (DCT) and wavelet transform (WT), to name a few examples. While, in general, direct methods may be better than the transform methods when considering the complexity of the compression system, transform methods often provide improved compression ratios and may not be as sensitive to noise in the ECG data.

SUMMARY

In accordance with some implementations, methods for compressing electrocardiogram (ECG) data may include receiving a one-dimensional (1-D) ECG signal, generating a two-dimensional (2-D) ECG data array from the 1-D ECG signal, wavelet transforming the 2-D ECG data array to generate wavelet coefficients including a low frequency subband, a first intermediate frequency subband, a second intermediate frequency subband, and a high-frequency subband, and encoding the wavelet coefficients to generate compressed ECG data. Encoding the wavelet coefficients may include subjecting the low frequency subband to a first encoding scheme, subjecting the first intermediate frequency subband to a second encoding scheme different than the first encoding scheme, subjecting the second intermediate frequency subband to a third encoding scheme different than the first and second encoding schemes, and subjecting the high frequency subband to a fourth encoding scheme different than the first, second and third encoding schemes.

In accordance with some implementations, apparatus or systems for compressing ECG data may include one or more modules arranged to receive a one-dimensional (1-D) ECG signal, generate a two-dimensional (2-D) ECG data array from the 1-D ECG signal, wavelet transform the 2-D ECG data array to generate wavelet coefficients including a low frequency subband, a first intermediate frequency subband, a second intermediate frequency subband, and a high-frequency subband, and encode the wavelet coefficients to generate compressed ECG data. Encoding the wavelet coefficients may include subjecting the low frequency subband to a first encoding scheme, subjecting the first intermediate frequency subband to a second encoding scheme different than the first encoding scheme, subjecting the second intermediate frequency subband to a third encoding scheme different than the first and second encoding schemes, and subjecting the high frequency subband to a fourth encoding scheme different than the first, second and third encoding schemes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates an example computer program product;

DETAILED DESCRIPTION

Figure 1:
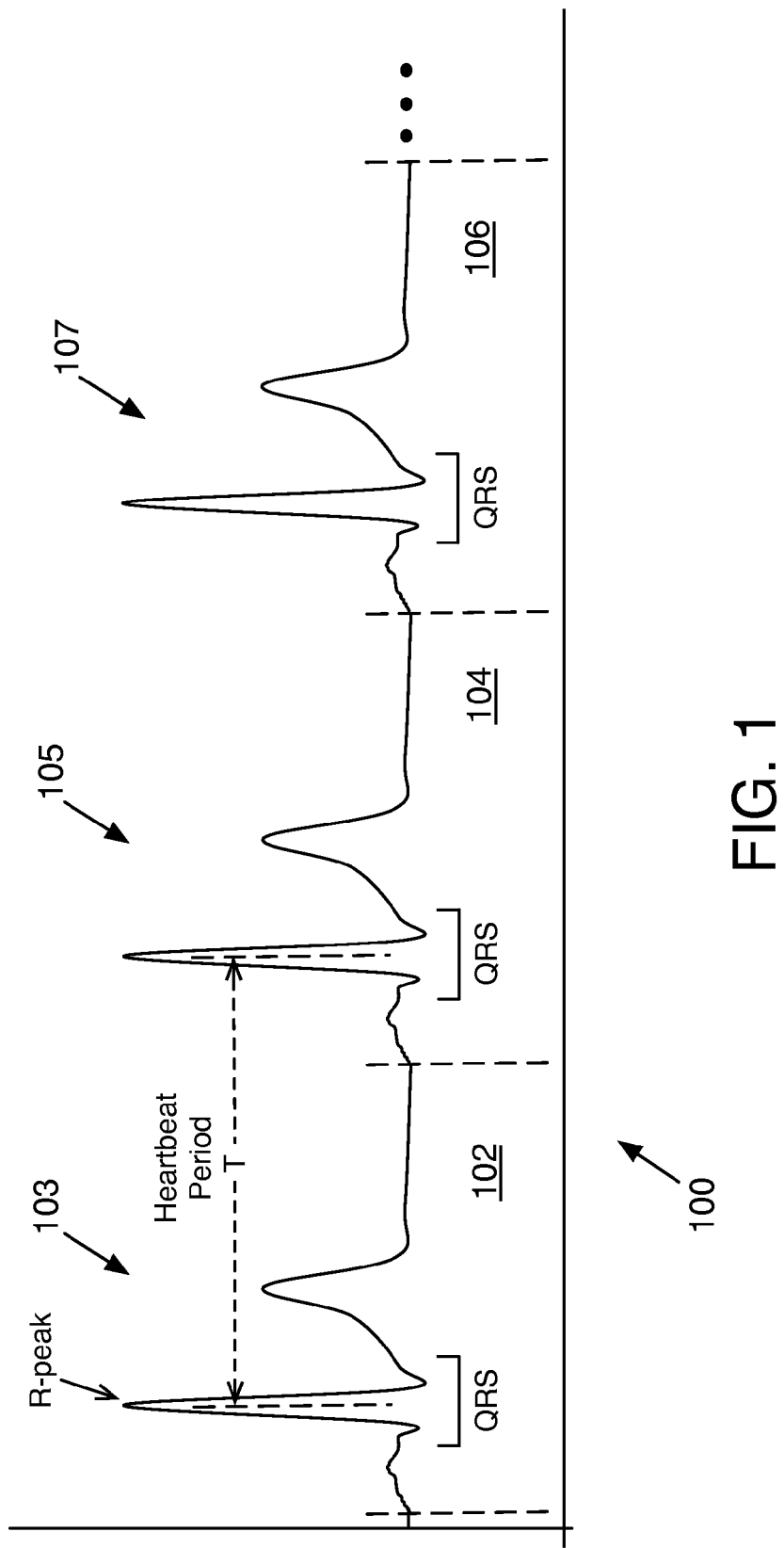
FIG. 1 illustrates a diagram of a portion of an example 1-D ECG signal.

The following description sets forth various examples along with specific details to provide a thorough understanding of the claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring the claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, separated and designed in a wide variety of different configurations, all of which are explicitly contemplated and make part of this disclosure.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

This disclosure is drawn, inter alia, to methods, apparatus, and systems related to two-dimensional (2-D) electrocardiogram (ECG) compression based on wavelet transform.

FIG. 1 illustrates a diagram of a portion of an example one-dimensional (1-D) ECG signal 100, arranged in accordance with at least some embodiments of the present disclosure. As can be seen in FIG. 1, 1-D ECG signal 100 may be characterized as a series of consecutive ECG waveform segments 102, 104 and 106, each including a corresponding heartbeat 103, 105 and 107 characterized by an associated QRS complex. Each ECG waveform segment 102, 104 and 106 may be characterized as having a substantially similar duration or period. Each heartbeat 103, 105 and 107 may be characterized by a heartbeat period T and an R-peak as shown in FIG. 1. While FIG. 1 illustrates ECG signal 100 as having a small number of heartbeats, ECG signals may, in general, include a larger number of heartbeats, and associated QRS complexes, representing significant quantities of data that may need to be transmitted and/or stored for subsequent analysis. The example ECG signal 100 of FIG. 1 may not be representative of an actual ECG signal in terms of relative intensities of the heartbeat waveforms, heartbeat periods, etc. and has been provided herein purely for explanatory purposes and should not be construed as limiting claimed subject matter in any manner.

In accordance with the present disclosure, individual heartbeats, each corresponding to a separate QRS complex, may be detected in a one-dimensional (1-D) ECG signal, and the 1-D ECG signal may then be segmented into portions, where each portion includes a single heartbeat. The segmented ECG signal portions may then be arranged into a 2-D ECG data array. The average heartbeat period of the ECG signal portions and the differences between the individual heartbeat periods and the average heartbeat period for each of the ECG signal segments or portions may be determined. In addition, the average R-peak value and the differences between the individual R-peak values and the average R-peak value for each of the ECG signal segments or portions may also be determined.

In accordance with the present disclosure, the 2-D ECG data array may then be subjected to a 2-D wavelet transform to generate a 2-D array of wavelet coefficients corresponding to the transformed 2-D ECG data array where the 2-D wavelet coefficient array may include multiple subbands. Different subbands of the 2-D wavelet coefficient array may then be subjected to different encoding schemes.

In accordance with the present disclosure, in some examples, a 2-D wavelet coefficient array may include multiple subbands, such as a low frequency subband, one or more intermediate frequency subbands, one or more second intermediate frequency subbands, or one or more high-frequency subbands, and the wavelet coefficients of the various subbands may be subjected to different encoding schemes. For example, in various implementations, a lossless encoding scheme may be applied to the wavelet coefficients of a low frequency subband, a set partitioning in hierarchical trees (SPIHT) encoding scheme may be applied to the wavelet coefficients of the first intermediate frequency subbands, a modified SPIHT encoding scheme may be applied to the wavelet coefficients of the second intermediate frequency subbands, and a wavelet-tree vector-quantization (VQ) encoding scheme may be applied to the wavelet coefficients of the high-frequency subbands.

Figure 2:
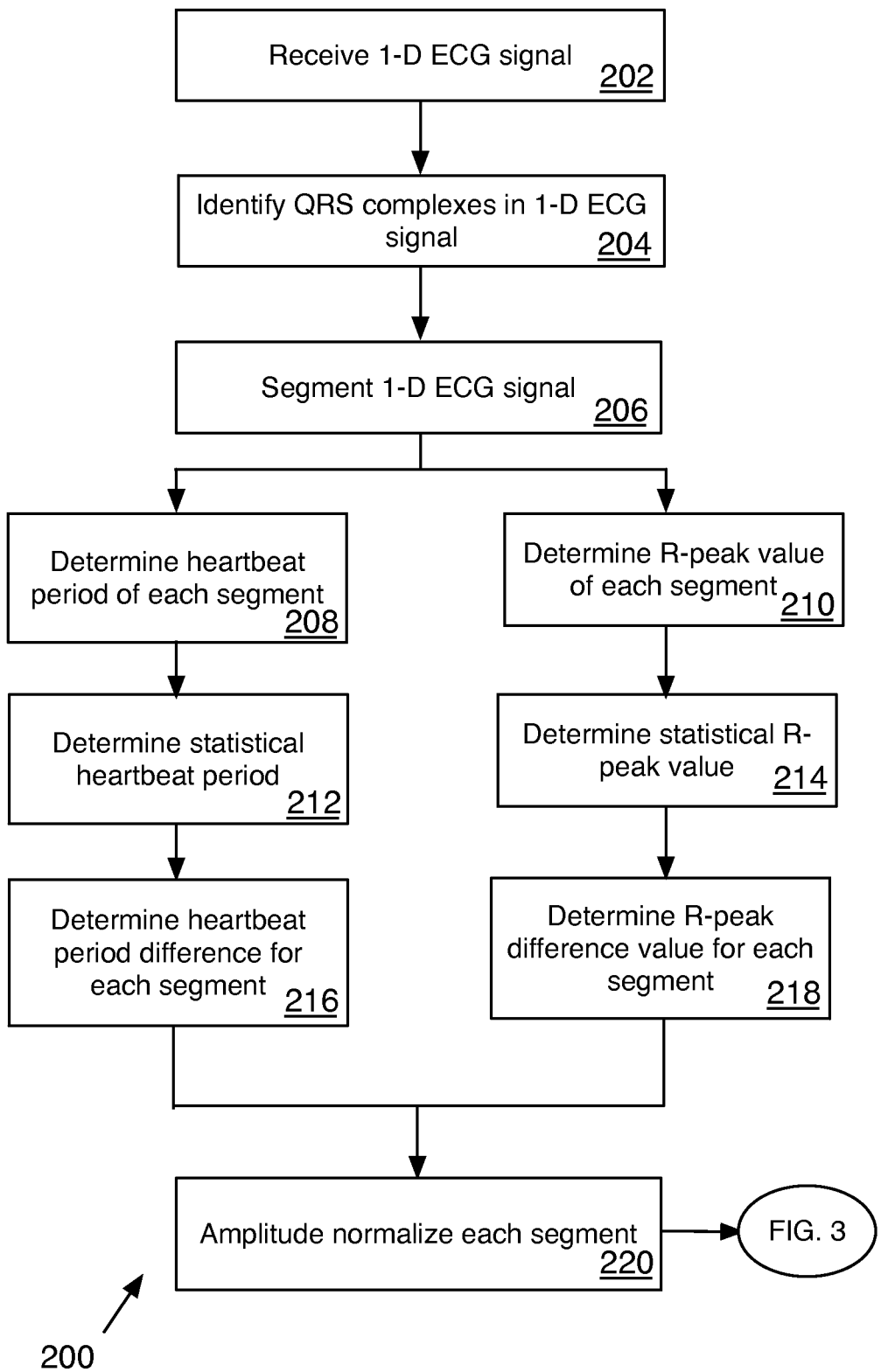
FIGS. 2 and 3 illustrate a flow diagram of a process for hybrid 2-D ECG data compression based on wavelet transforms.
Figure 3:
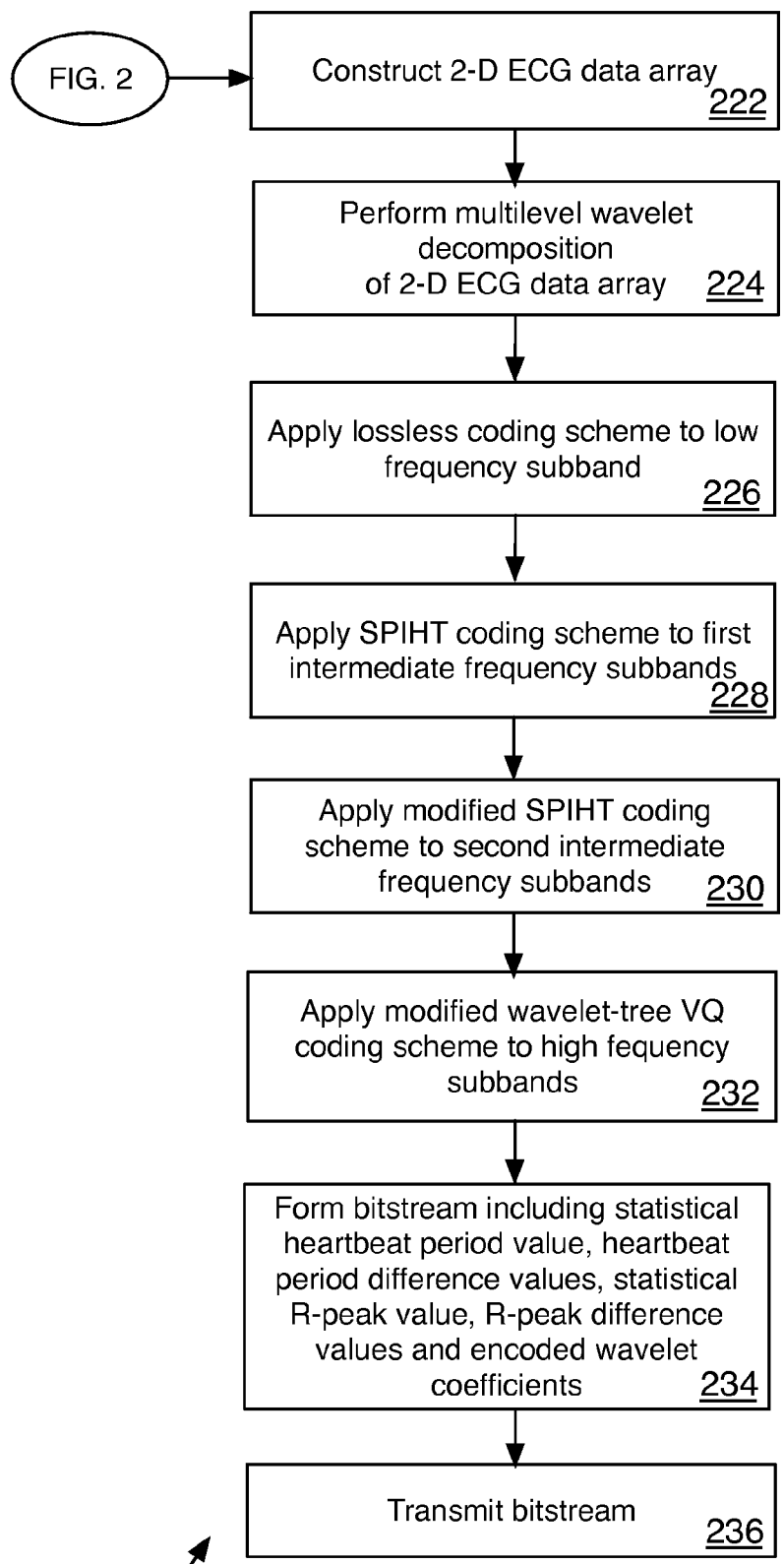

FIGS. 2 and 3 illustrate a flow diagram of a process 200 for hybrid 2-D ECG data compression based on wavelet transforms, arranged in accordance with at least some embodiments of the present disclosure. Process 200 may include one or more operations, functions or actions as illustrated by one or more of blocks 202, 204, 206, 208, 210, 212, 214, 216, 218, 220, 222, 224, 226, 228, 230, 232, 234 and/or 236. Process 200 may begin at block 202.

At block 202, a 1-D ECG signal may be received. In some examples, a digital ECG signal similar to ECG signal 100 of FIG. 1 may be received in block 202 at a device and/or system that may include processing logic, such as one or more microprocessors, providing or coupled to encoding logic.

In block 204, QRS complexes may be detected or identified in the 1-D ECG signal. For example, in various implementations, the QRS complexes may be detected or identified by applying any of a variety of well-known algorithms, such as the Okada algorithm or the Kadambe algorithm, to the received 1-D ECG signal. For example, referring also to FIG. 1, block 204 may include applying an Okada algorithm to ECG signal 100 in order to detect or identify the QRS complexes of heartbeats 103, 105 and 107. In this manner, the location of individual heartbeats in the 1-D ECG signal received in block 202 may be determined in block 204.

At block 206, the 1-D ECG signal may be segmented based, at least in part, on the detection of QRS complexes undertaken in block 204. For example, in some implementations, referring also to FIG. 1, block 206 may involve dividing or segmenting 1-D ECG signal 100 into segments 102, 104 and 106. In some implementations, a 1-D ECG signal may be segmented in block 206 so that each segment includes a single heartbeat. For example, a 1-D ECG signal containing 512 heartbeats may be segmented to generate 512 individual segments, each containing one heartbeat having an associated QRS complex. The heartbeat period of each segment may then be determined at block 208. For example, in some implementations, the heartbeat period value may be determined as the interval between R-peaks of adjacent heartbeats as shown in FIG. 1. At block 210, the amplitude value of the R-peak for each segment may be determined. For example, the R-peak of heartbeat 103 may have an amplitude value that may be determined in block 210 by identifying the largest valued data in segment 102.

At blocks 212 and 214, a statistical heartbeat period value of the ECG signal segments and a statistical R-peak value of the ECG signal segments may be determined, respectively. For example, having determined the heartbeat period values and R-peak values of the individual ECG segments in blocks 208 and 210, respectively, the individual heartbeat period values may be averaged together and the individual R-peak values may be averaged together in respective blocks 212 and 214. However, claimed subject matter is not limited in this regard and, rather than determining the statistical heartbeat period value and the statistical R-peak value as a mean value based on the respective segment heartbeat period values and R-peak values, other statistical values, such as median values for example, may be determined in 212 and 214. In addition, claimed subject matter is not limited to determining a statistical heartbeat period value and a statistical R-peak value subsequent to determining heartbeat period values and R-peak values of the individual ECG segments in blocks 208 and 210, and, therefore, blocks 212 and 214 may be undertaken at any time subsequent to receiving the ECG signal in block 202.

Subsequently, in block 216, heartbeat period difference values may be determined for each of the ECG segments by comparing the statistical heartbeat period determined in block 212 to the individual heartbeat periods determined in block 208. Similarly, in block 218, R-peak difference values may be determined for each of the ECG segments by comparing the statistical R-peak value determined in block 214 to the individual R-peak values determined in block 210.

At block 220, the amplitude of each segment may be normalized. For instance, within each segment, the value of each data point or sample of the segment may be divided by the R-peak value determined in block 210 so that the R-peak value has a value of one and all other samples in the segment have a value of less than one.

Referring now to FIG. 3, process 200 may continue at block 222 with the construction of a 2-D ECG data array from the normalized ECG segments resulting from block 220. In some implementations, block 222 may involve aligning the individual normalized ECG segments obtained in block 220 so that each segment represents a row of data values in the array and each segment's R-peak occurs at substantially the same column location in the resulting array.

Figure 4:
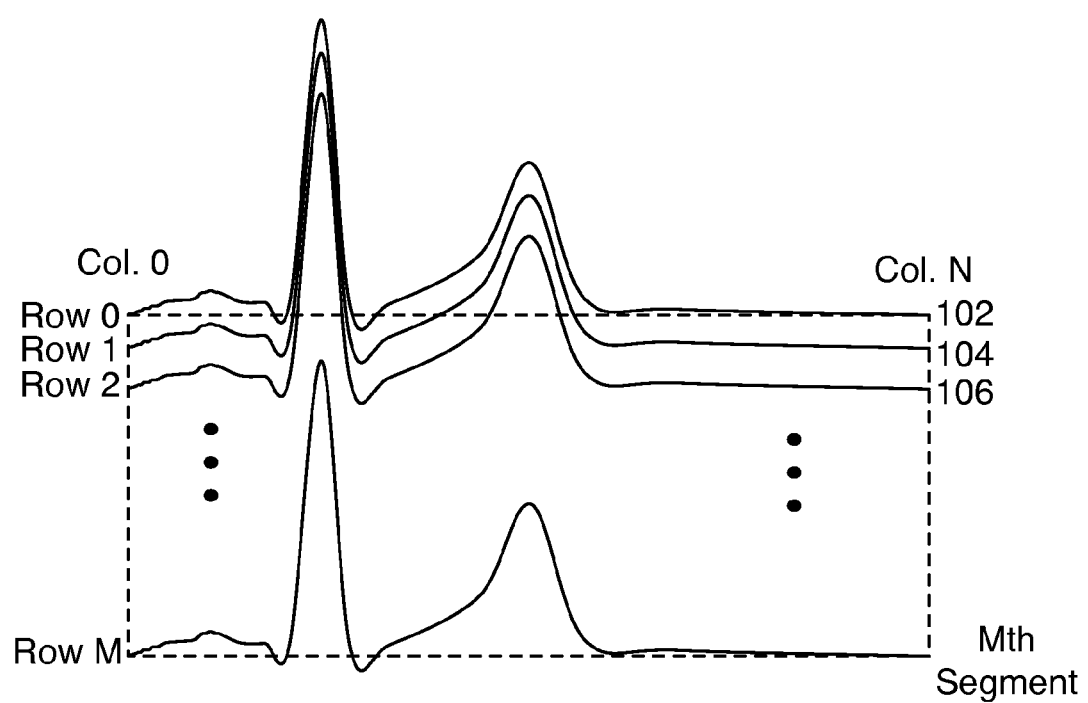
FIG. 4 illustrates a diagram of a portion of an example 2-D ECG data array.

For example, FIG. 4 illustrates a diagram of a portion of an example 2-D ECG data array 400 formed by aligning ECG segments, arranged in accordance with at least some embodiments of the present disclosure. In this example, referring also to FIG. 1, segments 102, 104 and 106 of ECG signal 100 have been aligned to form row 0, row 1 and row 2, respectively, of array 400. An array formed in accordance with block 222, e.g., example array 400, may be constructed by aligning all M segments of an ECG signal. Further, when constructing a 2-D ECG data array during the implementation of block 222, individual segments may be padded with one or more zero values so that the segments forming the array have the same overall duration and so that each segment spans the array from column 0 to column N.

Returning again to FIG. 3, the 2-D ECG data array constructed in block 222 may be subjected to multilevel wavelet decomposition in block 224. For example, in various implementations, block 224 may involve subjecting a 2-D ECG data array to a five-level wavelet decomposition employing the well-known lifting scheme 9/7 tap biorthogonal integer wavelet technique.

Figure 5:
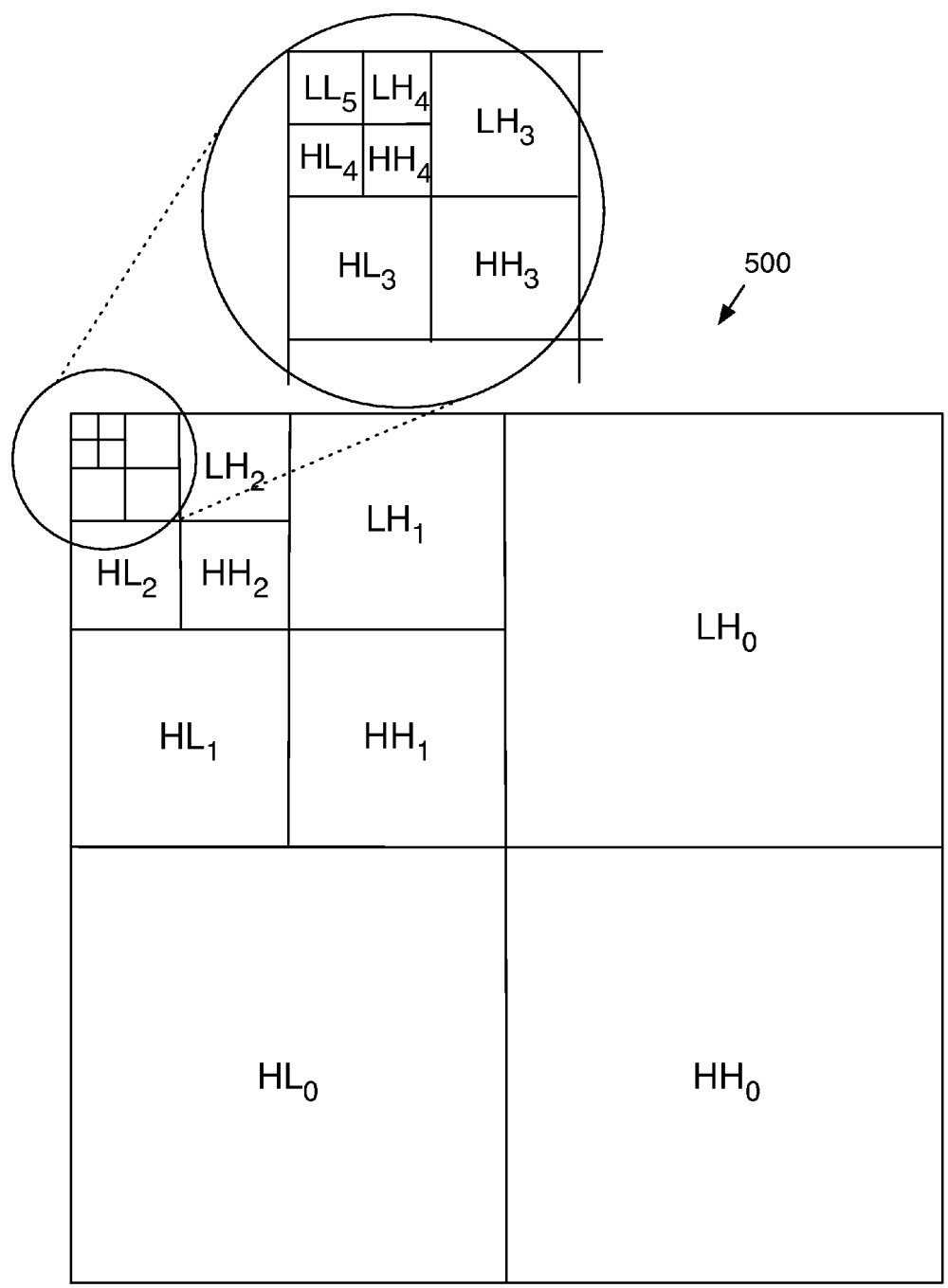
FIG. 5 illustrates a diagram of an example 2-D wavelet coefficient array.

FIG. 5 illustrates a diagram of an example 2-D ECG wavelet coefficient array 500 that may be formed by subjecting a 2-D ECG data array to a five-level wavelet decomposition in block 224, arranged in accordance with at least some embodiments of the present disclosure. ECG wavelet coefficient array 500 has multiple wavelet coefficient subbands including low-frequency subband $LL_5$, first intermediate frequency subbands $HL_4$, $LH_4$ and $HH_4$, second intermediate frequency subbands $HL_3$, $LH_3$ and $HH_3$, and high frequency subbands $HL_2$, $LH_2$, $HH_2$, $HL_1$, $LH_1$ and $HH_1$. Array 500 further includes highest frequency subbands $HL_0$, $LH_0$ and $HH_0$.

Referring again to FIG. 3, process 200 may continue with the application, at block 226, of a lossless encoding scheme, such as the well-known differential pulse code modulation algorithm, to the low frequency $LL_5$ subband of the 2-D ECG wavelet coefficient array resulting from block 224. At block 228, a Set Partitioning in Hierarchical Trees (SPIHT) scheme may be applied to the first intermediate frequency subbands $HL_4$, $LH_4$ and $HH_4$ of the 2-D ECG wavelet coefficient array.

In various examples, applying a SPIHT algorithm to subbands $HL_4$, $LH_4$ and $HH_4$ in block 228 may involve set partitioning a subset of wavelet coefficients at the same spatial positions in the subbands, comparing the wavelet coefficient values to a threshold and, if the wavelet coefficient values are less than the threshold, encoding the wavelet coefficients with zero values. If, however, the wavelet coefficient values meet or exceed the threshold, the subset of wavelet coefficients may be split according to a temporal orientation tree until all significant sets include a single significant point. After applying the same process to all wavelet coefficients occupying the same spatial positions in the subbands, the coefficients of the $HL_4$, $LH_4$ and $HH_4$ subbands may be compressed so that the most significant bit of each coefficient meeting or exceeding the threshold is provided in the encoded bitstream.

At block 230, a modified SPIHT scheme may be applied to the second intermediate frequency subbands $HL_3$, $LH_3$ and $HH_3$ of the 2-D ECG wavelet coefficient array. In various examples, applying a modified SPIHT algorithm to subbands $HL_3$, $LH_3$ and $HH_3$ in block 230 may involve simultaneously encoding coefficients at the same spatial positions in subbands $HL_3$, $LH_3$ and $HH_3$ by comparing the coefficients to a threshold and, if one or more of the coefficients meet or exceed the threshold, then a value of one may be assigned and all three coefficients may be encoded. Otherwise, if none of the coefficients meet or exceed the threshold, then a value of zero may be assigned and all three coefficients may not be encoded.

In block 232, a modified wavelet-tree vector quantization (VQ) scheme may be applied to the high frequency subbands $HL_2$, $LH_2$, $HH_2$, $HL_1$, $LH_1$ and $HH_1$ of the 2-D ECG wavelet coefficient array. In various examples, applying a modified wavelet-tree VQ algorithm to subbands $HL_2$, $LH_2$, $HH_2$, $HL_1$, $LH_1$ and $HH_1$ in block 232 may involve forming three codebooks CLH, CHL and CHH where the codevector of each codebook may be a tree vector (TV) having wavelet transformed coefficients arranged in the order of a hierarchical tree. Thus a tree vector may be formed using the wavelet coefficients having a parent-offspring relation where each tree-vector corresponds to one codevector in VQ. For instance, a codevector root point may include three wavelet coefficients at the same spatial position in subbands $LH_2$, $HL_2$ and $HH_2$. Further, in some examples, a distortion constrained codevector replenishment (DCCR) scheme may be applied while implementing the modified wavelet-tree VQ algorithm.

At block 234, a bitstream may be formed that may include statistical heartbeat value determined in block 212, the heartbeat period difference values determined in block 216, the statistical R-peak value determined in block 214, R-peak difference values determined in block 218, and the encoded wavelet coefficients of the 2-D wavelet coefficient array generated in blocks 226, 228, 230 and 232. In some examples, forming a bitstream in block 234 may include scanning the 2-D array of encoded wavelet coefficients to yield a 1-D bitstream of encoded wavelet coefficients. In block 236, the bitstream formed in block 234, and including the encoded wavelet coefficients derived from the wavelet transformed 2-D ECG data array, may be transmitted. Although not depicted in FIG. 3, process 200 may also include storing the bitstream formed in block 234 in computer readable storage media, such as memory.

Process 200, and other processes described herein, set forth various functional blocks or actions that may be described as processing steps, functional operations, events and/or acts, etc. Those skilled in the art in light of the present disclosure will recognize that numerous alternatives to the functional blocks shown in FIGS. 2 and 3 may be practiced in various implementations. For example, although process 200, as shown in FIGS. 2 and 3, includes one particular order of blocks or actions, the order in which these blocks or actions are presented does not necessarily limit the claimed subject matter to any particular order. Likewise, intervening actions not shown in FIGS. 2 and 3 and/or additional actions not shown in FIGS. 2 and 3 may be employed and/or some of the actions shown in FIGS. 2 and 3 may be eliminated, without departing from the scope of the claimed subject matter.

Figure 6:
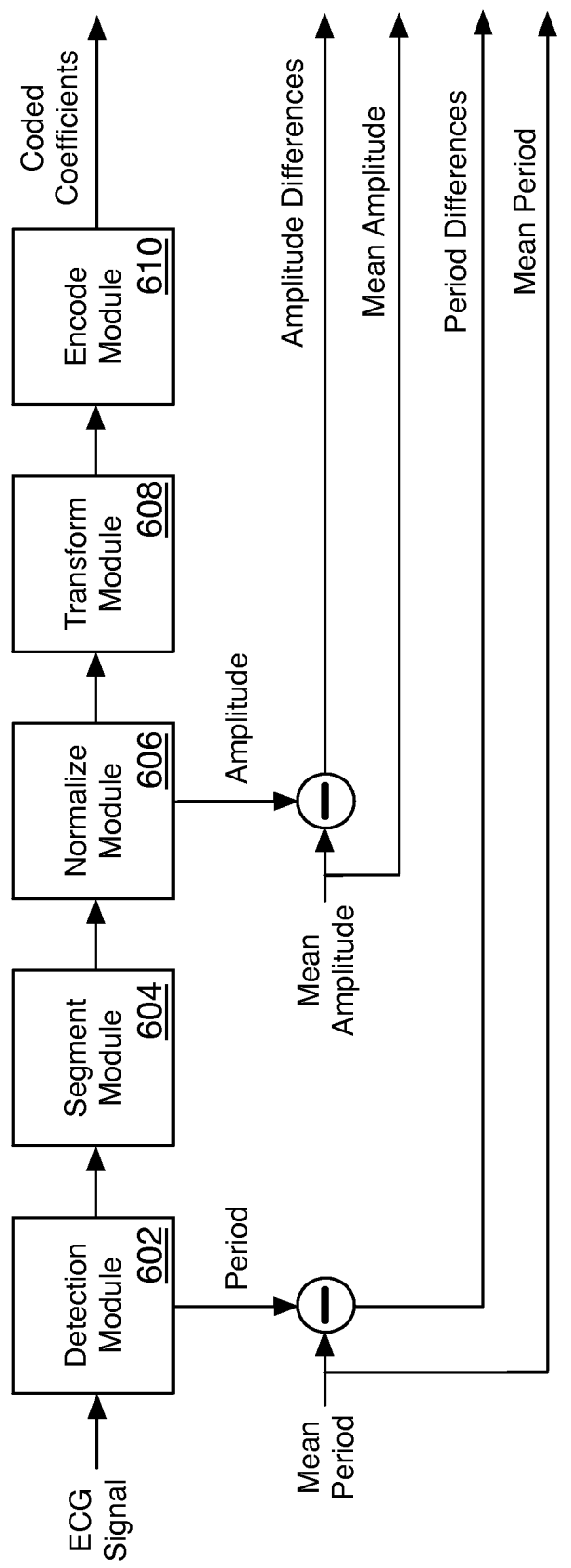
FIG. 6 illustrates an example system for hybrid 2-D ECG data compression based on wavelet transforms.

FIG. 6 illustrates an example apparatus or system 600 for hybrid 2-D ECG data compression based on wavelet transforms, arranged in accordance with at least some embodiments of the present disclosure. With reference to FIGS. 2 and 3, system 600 may include a detection module 602 that may receive a 1-D ECG signal and undertake blocks 202 and 204 of process 200, a segment module 604 that may undertake block 206, a normalize module 606 that may undertake blocks 220 and 222 of process 200, a wavelet transform module 608 that may undertake block 224 of process 200, and an encode module 610 that may undertake blocks 226, 228, 230 and/or 232 of process 200. In addition, in various examples, detection module 602 may undertake blocks 208, 212 and/or 216, while detection module 602 and/or segment module 604 may undertake blocks 210, 214 and/or 218.

Modules 602, 604, 606, 608 and/or 610 may be implemented any combination of hardware, software, and/or firmware. For example, one or more of modules 602, 604, 606, 608 and/or 610 of system 600 may be implemented, at least in part, in a microprocessor or Central Processing Unit (CPU), an Application Specific Integrated Circuit (ASIC), a Field Programmable Gate Array (FPGA), a digital signal processor (DSP), or other integrated formats. The coded coefficients, or compressed ECG data, produced by encode module 610, as well as the mean R-peak amplitude, R-peak amplitude difference values, mean period, and period difference values may be provided as output from system 600 for subsequent storage and/or transmission.

FIG. 7 illustrates an example computer program product 700, arranged in accordance with at least some embodiments of the present disclosure. Program product 700 may include a signal bearing medium 702. Signal bearing medium 702 may include one or more instructions 704 that, when executed by, for example, a processor, may provide the functionality described above with respect to FIGS. 2 and 3. Thus, for example, referring to the system of FIG. 6, the various modules of system 600 may undertake one or more of the blocks shown in FIGS. 2 and 3 in response to instructions 704 conveyed by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, referring to the system of FIG. 6, program product 700 may be wirelessly conveyed to system 600 by signal bearing medium 702, where signal bearing medium 702 is conveyed to system 600 by a wireless communications medium 710 (e.g., an wireless communications medium conforming with the 802.11 standard).

Figure 8:
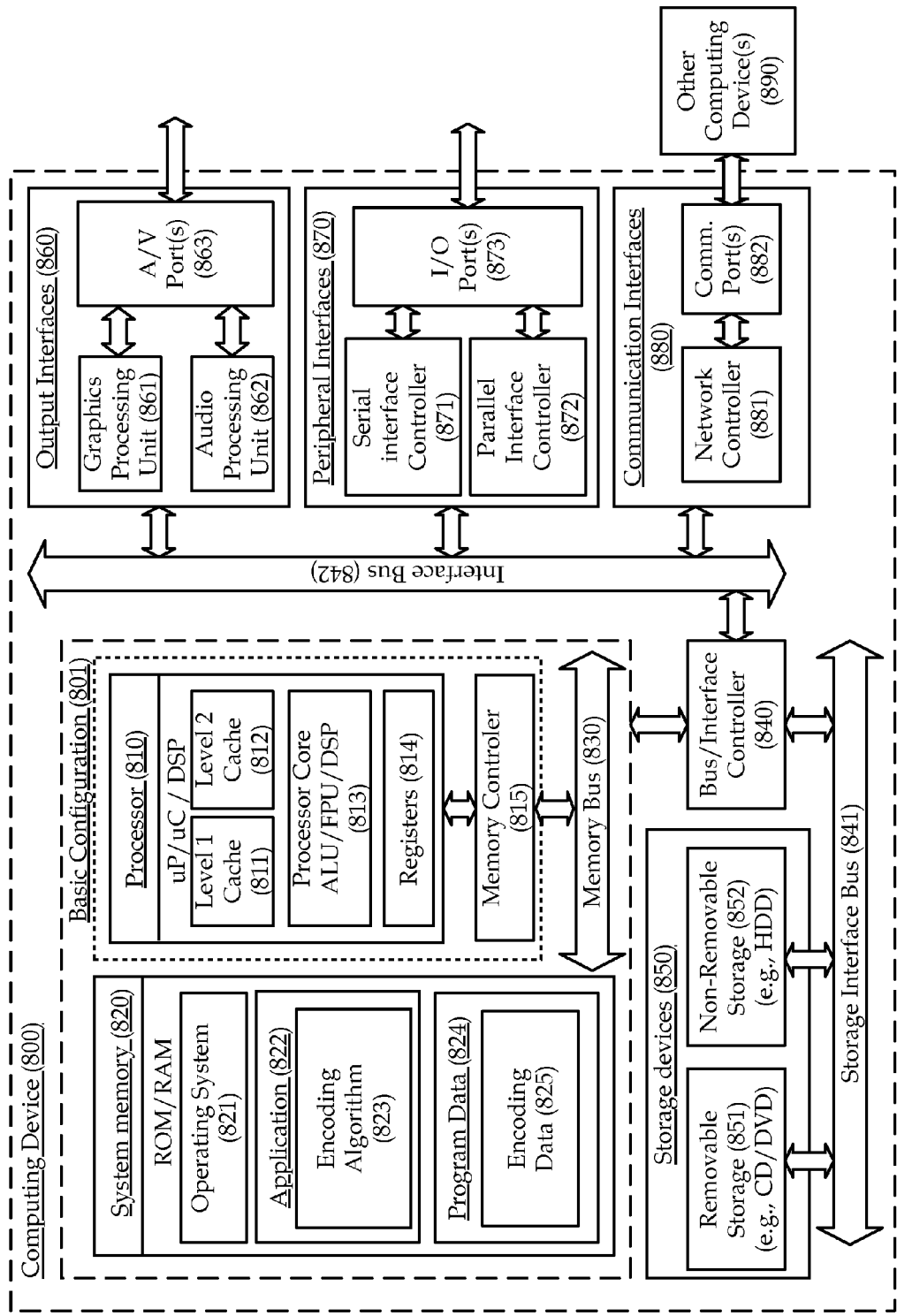
FIG. 8 is a block diagram illustrating an example computing device.

FIG. 8 is a block diagram illustrating an example computing device 800, arranged in accordance with at least some embodiments of the present disclosure. In some examples, computing device 800 may provide hybrid 2-D ECG data compression based on wavelet transforms in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes encoding algorithm 823 that may be arranged to perform the functions as described herein including the actions described with respect to providing hybrid 2-D ECG data compression based on wavelet transforms described with respect to the flow chart shown in FIGS. 2 and 3. Program Data 824 includes coding data 825, such as, for example wavelet transform parameters, that may be useful for implementing algorithm 823. In some examples, application 822 can be arranged to operate with program data 824 on an operating system 821 such that implementations of hybrid 2-D ECG data compression based on wavelet transforms, as described herein, may be provided. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which can be configured to communicate to various external devices such as a display or speakers via one or more A/V ports 863. Example peripheral interfaces 860 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which can be arranged to facilitate communications with one or more other computing devices 890 over a network communication via one or more communication ports 882. For example, a bitstream including wavelet coefficients coded in accordance with the present disclosure may be transmitted using interface 880, controller 881 and/or ports 882. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations or implemented in a workstation or a server configuration.

Figure 9:
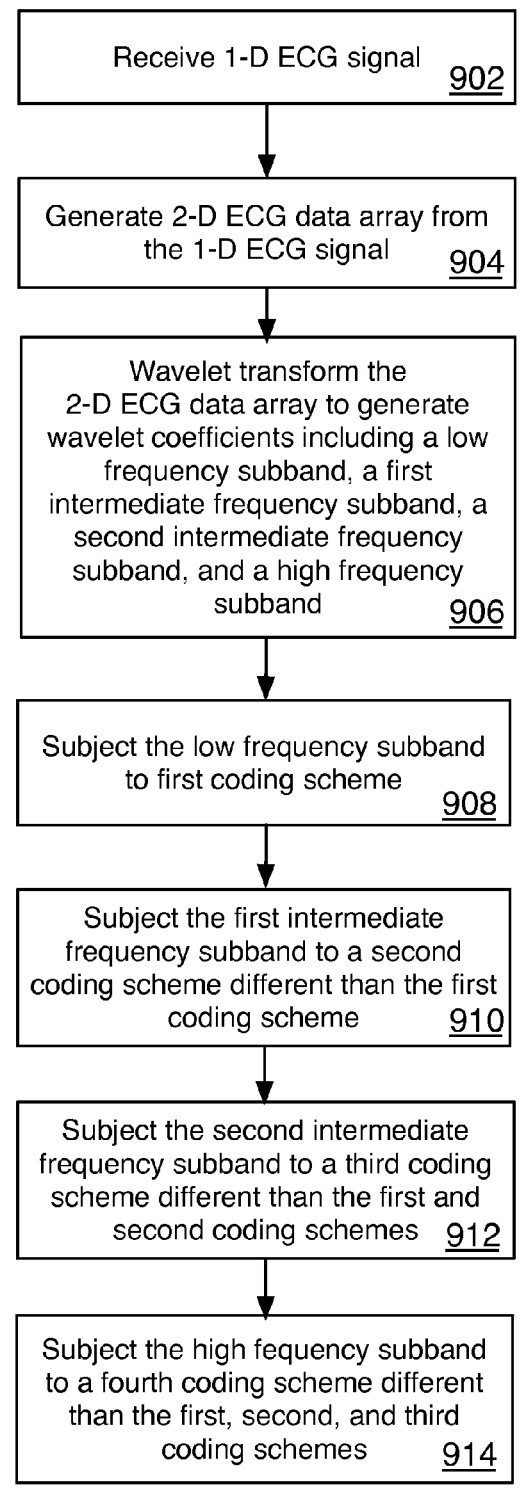
FIG. 9 illustrates a flow diagram of a process for hybrid 2-D ECG data compression based on wavelet transforms, all arranged in accordance with at least some embodiments of the present disclosure.
Figure 3:
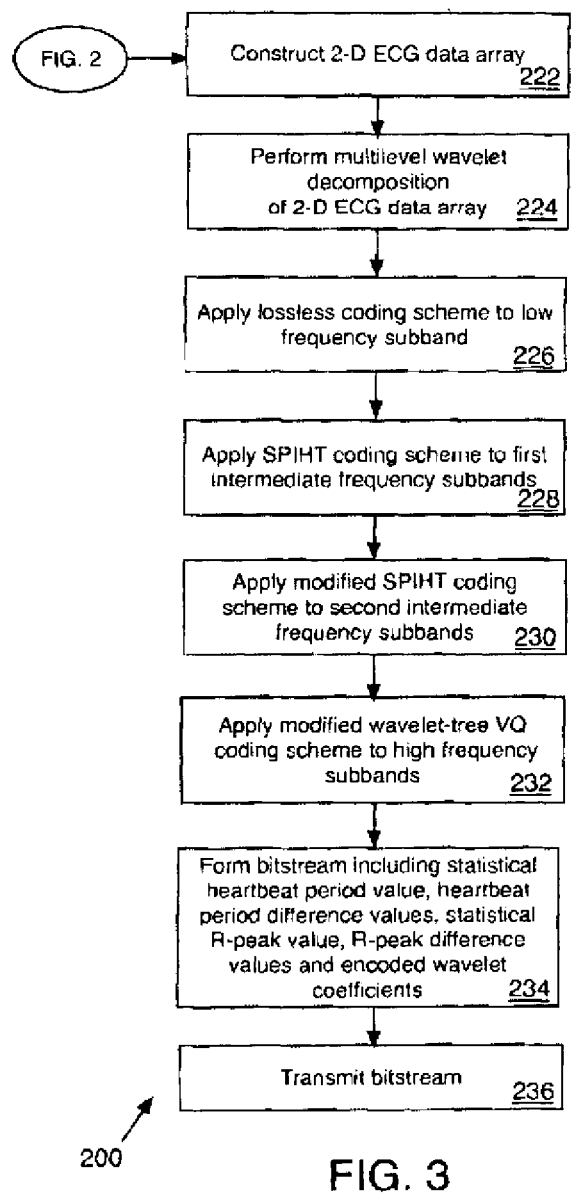
Figure 8:
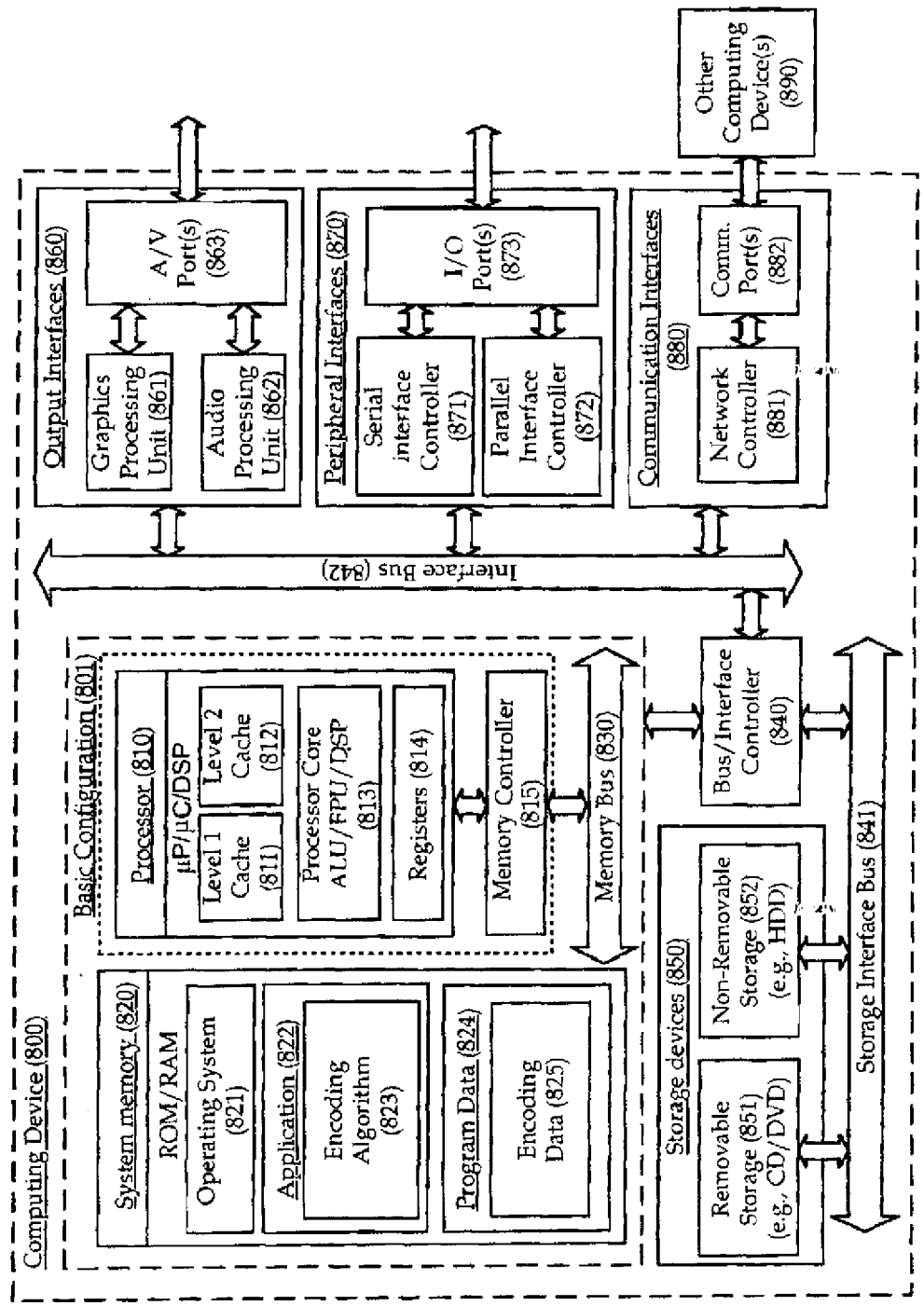

FIG. 9 illustrates a flow diagram of a process 900 for hybrid 2-D ECG data compression based on wavelet transforms, arranged in accordance with at least some embodiments of the present disclosure. Process 900 may include one or more operations, functions or actions as illustrated by one or more of blocks 902, 904, 906, 908, 910, 912 and/or 914. Process 900 may begin at block 902 with the reception of a 1-D ECG signal.

At block 904, a 2-D ECG data array may be generated from the 1-D ECG signal. In block 906, the 2-D ECG data array may be wavelet transformed to generate wavelet coefficients including a low frequency subband, a first intermediate frequency subband, a second intermediate frequency subband, and a high-frequency subband. For example, the 2-D ECG data array generated in block 904 may be five-level wavelet transformed in block 906 to provide multiple wavelet coefficient subbands including low-frequency subband $LL_5$, first intermediate frequency subbands $HL_4$, $LH_4$ and $HH_4$, second intermediate frequency subbands $HL_3$, $LH_3$ and $HH_3$, and high frequency subbands $HL_2$, $LH_2$, $HH_2$, $HL_1$, $LH_1$ and $HH_1$.

At blocks 908, 910, 912 and 914 the wavelet coefficients of the various subbands may be encoded to generate compressed ECG data. Encoding the wavelet coefficient subbands may include subjecting the low frequency subband to a first encoding scheme at block 908, subjecting the first intermediate frequency subband to a second encoding scheme different than the first encoding scheme at block 910, subjecting the second intermediate frequency subband to a third encoding scheme different than the first and second encoding schemes at block 912, and subjecting the high frequency subband to a fourth encoding scheme different than the first, second and third encoding schemes at block 914.

For example, block 908 may include subjecting the low frequency subband $LL_5$ to a lossless encoding scheme, block 910 may include subjecting one or more of the first intermediate frequency subbands $HL_4$, $LH_4$ and/or $HH_4$ to a SPIHT encoding scheme, block 912 may include subjecting one or more of the second intermediate frequency subbands $HL_3$, $LH_3$ and $HH_3$ to a modified SPIHT encoding, and block 914 may include subjecting one or more of the high frequency subbands $HL_2$, $LH_2$, $HH_2$, $HL_1$, $LH_1$ and/or $HH_1$ to a modified wavelet-tree VQ encoding scheme, all as described previously herein.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for automatically compressing electrocardiogram (ECG) data, comprising:
   receiving a one-dimensional (1-D) ECG signal;
   generating a two-dimensional (2-D) ECG data array from the 1-D ECG signal;
   wavelet transforming the 2-D ECG data array to generate wavelet coefficients including a low frequency subband, a first intermediate frequency subband, a second intermediate frequency subband, and a high-frequency subband; and
   encoding the wavelet coefficients to generate compressed ECG data,
   wherein encoding the wavelet coefficients comprises subjecting the low frequency subband to a first encoding scheme, subjecting the first intermediate frequency subband to a second encoding scheme different than the first encoding scheme, subjecting the second intermediate frequency subband to a third encoding scheme different than the first and second encoding schemes, and subjecting the high frequency subband to a fourth encoding scheme different than the first, second and third encoding schemes.

2. The method of claim 1, wherein the first encoding scheme comprises a lossless encoding scheme, wherein the second encoding scheme comprises a set partitioning in hierarchical trees (SPIHT) encoding scheme, wherein the third encoding scheme comprises a modified SPIHT encoding scheme, and wherein the fourth encoding scheme comprises a wavelet-tree vector quantization (VQ) encoding scheme.

3. The method of claim 2, wherein the lossless encoding scheme comprises differential pulse code modulation.

4. The method of claim 1, wherein wavelet transforming the 2-D ECG data array comprises applying a five-level wavelet decomposition to the 2-D ECG data array.

5. The method of claim 1, further comprising:
   identifying a plurality of heartbeat waveforms in the 1-D ECG signal;
   determining a plurality of heartbeat periods, each heartbeat period associated with a separate one of the plurality of heartbeat waveforms;
   determining a statistical heartbeat period from the plurality of heartbeat periods; and
   determining a plurality of heartbeat period difference values corresponding to differences between the statistical heartbeat period and a heartbeat period of each of the plurality of heartbeat waveforms.

6. The method of claim 1, further comprising:
   identifying a plurality of heartbeat waveforms in the 1-D ECG signal;
   determining a plurality of R-peak values, each R-peak value associated with a separate one of the plurality of heartbeat waveforms;
   determining a statistical R-peak value from the plurality of R-peak values; and
   determining a plurality of R-peak difference values corresponding to differences between the statistical R-peak value and a R-peak value of each of the plurality of R-peak values.

7. The method of claim 1, wherein generating the 2-D ECG data array from the 1-D ECG signal comprises:
   identifying a plurality of heartbeat waveforms in the 1-D ECG signal;
   segmenting the 1-D ECG signal into a plurality of signal portions, each signal portion corresponding to a different one of the plurality of heartbeat waveforms; and
   arranging the signal portions to form the 2-D ECG data array.

8. The method of claim 7, wherein arranging the signal portions to form the 2-D ECG data array comprises:
   padding one or more of the signal portions with data such that each of the signal portions has substantially the same duration; and
   amplitude normalizing the plurality of signal portions.

9. A non-transitory computer-readable medium comprising instructions, that, when executed, cause a programmable processor to perform the steps of:
   receiving a one-dimensional (1-D) ECG signal;
   generating a two-dimensional (2-D) ECG data array from the 1-D ECG signal;
   wavelet transforming the 2-D ECG data array to generate wavelet coefficients including a low frequency subband, a first intermediate frequency subband, a second intermediate frequency subband, and a high-frequency subband; and
   encoding the wavelet coefficients to generate compressed ECG data,
   wherein encoding the wavelet coefficients comprises subjecting the low frequency subband to a first encoding scheme, subjecting the first intermediate frequency subband to a second encoding scheme different than the first encoding scheme, subjecting the second intermediate frequency subband to a third encoding scheme different than the first and second encoding schemes, and subjecting the high frequency subband to a fourth encoding scheme different than the first, second and third encoding schemes.

10. The non-transitory computer-readable medium of claim 9, wherein the first encoding scheme comprises a lossless encoding scheme, wherein the second encoding scheme comprises a set partitioning in hierarchical trees (SPIHT) encoding scheme, wherein the third encoding scheme comprises a modified SPIHT encoding scheme, and wherein the fourth encoding scheme comprises a wavelet-tree vector quantization (VQ) encoding scheme.

11. The non-transitory computer-readable medium of claim 10, wherein the lossless encoding scheme comprises differential pulse code modulation.

12. The non-transitory computer-readable medium of claim 9, wherein instructions for wavelet transforming the 2-D ECG data array further comprise instructions that, when executed, result in applying a five-level wavelet decomposition to the 2-D ECG data array.

13. The non-transitory computer-readable medium of claim 9, further comprising instructions that, when executed, result in:
   identifying a plurality of heartbeat waveforms in the 1-D ECG signal;
   determining a plurality of heartbeat periods, each heartbeat period associated with a separate one of the plurality of heartbeat waveforms;
   determining a statistical heartbeat period from the plurality of heartbeat periods; and
   determining a plurality of heartbeat period difference values corresponding to differences between the statistical heartbeat period and a heartbeat period of each of the plurality of heartbeat waveforms.

14. The non-transitory computer-readable medium of claim 9, further comprising instructions that, when executed, result in:
   identifying a plurality of heartbeat waveforms in the 1-D ECG signal;
   determining a plurality of R-peak values, each R-peak value associated with a separate one of the plurality of heartbeat waveforms;
   determining a statistical R-peak value from the plurality of R-peak values; and
   determining a plurality of R-peak difference values corresponding to differences between the statistical R-peak value and a R-peak value of each of the plurality of R-peak values.

15. The non-transitory computer-readable medium of claim 9, wherein instructions for generating the 2-D ECG data array from the 1-D ECG signal further comprise instructions that, when executed, result in:
   identifying a plurality of heartbeat waveforms in the 1-D ECG signal;
   segmenting the 1-D ECG signal into a plurality of signal portions, each signal portion corresponding to a different one of the plurality of heartbeat waveforms; and
   arranging the signal portions to form the 2-D ECG data array.

16. The non-transitory computer-readable medium of claim 15, wherein instructions for arranging the signal portions to form the 2-D ECG data array further comprise instructions that, when executed, result in:
   padding one or more of the signal portions with data such that each of the signal portions has substantially the same duration; and
   amplitude normalizing the plurality of signal portions.

17. A system for automatically compressing electrocardiogram (ECG) data, comprising:
   one or more processors configured to:
   receive a one-dimensional (1-D) ECG signal;
   generate a two-dimensional (2-D) ECG data array from the 1-D ECG signal;
   wavelet transform the 2-D ECG data array to generate wavelet coefficients including a low frequency subband, a first intermediate frequency subband, a second intermediate frequency subband, and a high-frequency subband; and
   encode the wavelet coefficients to generate compressed ECG data,
   wherein encoding the wavelet coefficients comprises subjecting the low frequency subband to a first encoding scheme, subjecting the first intermediate frequency subband to a second encoding scheme different than the first encoding scheme, subjecting the second intermediate frequency subband to a third encoding scheme different than the first and second encoding schemes, and subjecting the high frequency subband to a fourth encoding scheme different than the first, second and third encoding schemes.

18. The system of claim 17, wherein the first encoding scheme comprises a lossless encoding scheme, wherein the second encoding scheme comprises a set partitioning in hierarchical trees (SPIHT) encoding scheme, wherein the third encoding scheme comprises a modified SPIHT encoding scheme, and wherein the fourth encoding scheme comprises a wavelet-tree vector quantization (VQ) encoding scheme.

19. The system of claim 18, wherein the lossless encoding scheme comprises differential pulse code modulation.

20. The system of claim 17, wherein one or more processors are configured to wavelet transform the 2-D ECG data array by applying a five-level wavelet decomposition to the 2-D ECG data array.

* * * * *

UNITED STATES PATENT AND TRADEMARK OFFICE
CERTIFICATE OF CORRECTION

| | |
|---|---|
| PATENT NO. | : 8,548,574 B2 |
| APPLICATION NO. | : 12/835277 |
| DATED | : October 1, 2013 |
| INVENTOR(S) | : Wang |

It is certified that error appears in the above-identified patent and that said Letters Patent is hereby corrected as shown below:

On Title Page 2, in Item (56), under "OTHER PUBLICATIONS", in Column 1, Line 9, delete "Biomedial" and insert -- Biomedical --, therefor.

On Title Page 2, in Item (56), under "OTHER PUBLICATIONS", in Column 1, Line 16, delete "et al," and insert -- et al., --, therefor.

In the Drawings

Delete drawing sheet 3 of 9 and substitute the attached drawing sheet 3 of 9 therefor.

Delete drawing sheet 8 of 9 and substitute the attached drawing sheet 8 of 9 therefor.

In the Specifications

In Column 11, Line 13, delete "and or" and insert -- and/or --, therefor.

In Column 13, Line 4, delete "include an" and insert -- include a --, therefor.

Signed and Sealed this
Twenty-sixth Day of August, 2014

Michelle K. Lee
*Deputy Director of the United States Patent and Trademark Office*